Patented Sept. 3, 1946

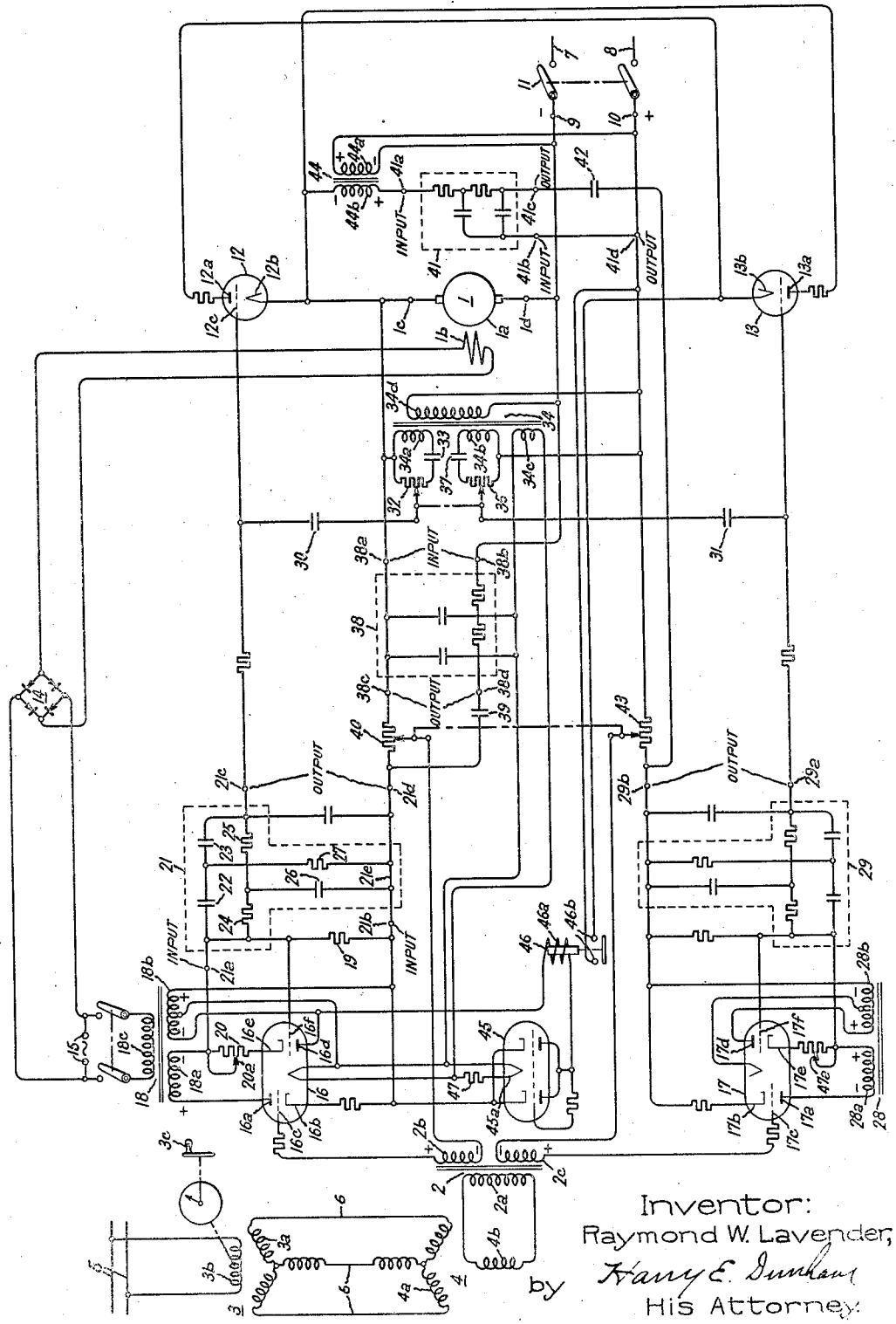

2,407,084

UNITED STATES PATENT OFFICE 2,407,084

MOTOR CONTROL APPARATUS

Raymond W. Lavender, Waterford, N. Y., assignor to General Electric Company, a corporation of New York Application January 23, 1945, Serial No. 574,087

8 Claims. (Cl. 172—239)

This invention relates to apparatus for controlling the operation of an electric motor, more particularly to electric valve amplifier apparatus for controlling the speed and direction of rotation of a motor in response to a direct signal voltage, and it has for an object the provision of a simple, reliable, and improved apparatus of this character.

In carrying the invention into effect in one form thereof, a pair of electric power valves such as Thyratrons are provided for controlling the supply of voltage to the motor. These valves are reversely connected in parallel between one motor terminal and one terminal of a source of alternating voltage, of which the other terminal is direct-connected to the other motor terminal. Means are provided for selectively supplying direct signal voltages to the grid circuits of the power valves, thereby to energize the valves selectively and to effect rotation of the motor in a selected direction at a speed corresponding to the magnitude of the signal voltage. For the purpose of preventing hunting or overshooting operation, a feedback voltage is supplied to the grid circuit of each of the power valves. The cathode of one of the valves is direct-connected to one armature terminal, and the feedback voltage for this valve is derived from the countervoltage of the motor by means of connections from the cathode and from the opposite armature terminal to the grid circuit. Similarly, the feedback for the reversely connected valve is derived from the countervoltage by means of connections from its cathode and the opposite armature terminal to the grid circuit. The cathode of this valve is separated from the armature by the supply source. In order to eliminate the effect of the voltage of the source from this feedback voltage, a voltage of the same magnitude and of opposite phase is supplied by means of a transformer of which the secondary winding is connected in series in these connections and the primary winding is connected to the source.

The selective energization of these valves is accomplished by means of phase discriminator electric valve apparatus in response to alternating signal voltages which are out of phase with each other. This phase discriminator apparatus has two output channels, each leading to the input of a different power valve. The output voltage of the phase discriminator is a periodically varying voltage having an alternating component and a direct component of which the magnitude varies as the magnitude of the alternating signal voltage. Included in each of these channels between the amplifier and the power valve is a twin T-bridge which is balanced at the frequency of the periodically varying voltage to produce zero alternating voltage output. The direct component of the periodically varying voltage passes through the twin T-bridge and is supplied to the input circuit of the power valve.

For a better and more complete understanding of the invention, reference should now be had to the following specification and to the accompanying drawing of which the single figure is a simple, diagrammatical illustration of an embodiment of the invention.

In illustrating the invention in one form, it is shown as embodied in a follow-up control system.

Referring now to the drawing, a motor 1 is to be controlled in response to an alternating signal voltage which is applied to the primary winding 2a of a transformer 2. This signal voltage may be derived from any suitable means. For example, it may be derived from a tachometer generator driven by a motor, or it may be derived from a potentiometer connected across a source of alternating voltage or from the receiver regulator Selsyn in a Selsyn follow-up control system. The signal voltage may vary in magnitude and reverse in phase. The motor is to be controlled so that its speed corresponds to the magnitude of the signal voltage and its direction of rotation reverses in response to reversal of the phase of the signal voltage.

In the illustrated embodiment, the alternating signal voltage is produced by means of the Selsyn transmitter 3 and the Selsyn receiver regulator 4 of a Selsyn follow-up control system. The transmitter 3 comprises a stator member (not shown) which is provided with a distributed three-element winding 3a that is physically similar to the three-phase winding of a wound rotor induction motor. It is arranged in inductive relationship with a single-phase winding 3b on the rotor. The rotor winding 3b is supplied from a suitable source of single-phase voltage such as is represented by the two supply conductors 5.

The rotor member may be rotated in either direction by any suitable means which is illustrated as a manually operated crank 3c. The receiver regulator is similar to the transmitter; i. e., its stator member (not shown) is provided with a distributed three-element winding 4a of which the terminals are connected by means of conductors 6 to corresponding terminals of the stator winding of the transmitter. The rotor winding 4b is connected to the primary winding of the signal voltage input transformer 2. The rotor member is mechanically coupled through suitable reduction gearing (not shown) to the armature of motor 1.

When the rotor winding 3a of the transmitter is energized, an alternating magnetic field is produced which induces voltages in the three winding legs of the stator winding of which the magnitudes depend upon the angular relationship between the axis of the rotor winding and the axes of the three winding legs of the winding 3a. These voltages cause currents to flow in the three winding legs of the stator winding of the receiver regulator, and these currents produce an alternating magnetic field of which the position of its axis in space corresponds to the position in space of the axis of the magnetic field of the transmitter.

When the rotors of the transmitter and the receiver regulator are in positions of correspondence; i. e., when the axis of the rotor member of the receiver regulator is at right angles to the axis of the magnetic field of the stator winding, the voltage induced in the rotor winding is zero. If the rotor winding 3b of the transmitter is rotated in a clockwise direction from the position of correspondence, a voltage is induced in the rotor winding 4b of which the magnitude depends upon the angular disagreement of the rotor windings of the transmitter and receiver. Similarly, a counterclockwise rotation of the rotor of the transmitter causes a voltage of reverse phase to be induced in the secondary winding of which the magnitude is proportional to the disagreement.

The armature 1a is supplied from a suitable source of alternating voltage which is represented by the two conductors 7 and 8 to which the supply terminals 9 and 10 are connected by means of a switching device 11. For the purpose of supplying current in opposite directions to the armature, two electric power valves 12 and 13, which are preferably Thyratrons, are provided. These Thyratrons are reversely connected in parallel; i. e., the anode 12a of the Thyratron 12 is connected to the cathode 13b of Thyratron 13, and the anode 13a is connected to the cathode 12b. The cathode 12b and the anode 13a are directly connected to armature terminal 1c, whereas the anode 12a and the cathode 13b are connected to the terminal 10 of the source, and the opposite terminal 9 of the source is connected to the armature terminal 1d. Thus the source is interposed between the cathode 13b and the armature. When the power valve 12 is conducting, the armature rotates in one direction and when the Thyratron 13 is conducting, the rotation is in the reverse direction.

The field winding 1b of the motor is supplied through a full-wave biphase rectifier 14 from a source of alternating voltage which is represented by the terminals 15, which source may be and preferably is the same as that represented by the supply conductors 5.

For the purpose of controlling the selective energization of the Thyratron, an electric valve type amplifier comprising the twin triode electric valves 16 and 17 is provided. The left-hand conducting paths of valves 16 and 17 constitute a phase discriminator for the selective energization of the Thyratrons in response to signal voltages of reverse phase, and the right-hand conducting paths conduct during the inverse half-cycle; i. e., the half-cycles in which the anode voltages of the left-hand conducting paths are negative.

Both conducting paths of valves 16 and 17 are supplied with alternating voltage from two secondary windings 18a and 18b of a transformer 18, of which the primary winding 18c is connected to the source 15. As shown, the anode 16a is connected to one terminal of the secondary winding 18a, and the cathode 16b is connected through the resistor 19 to the other secondary terminal. Similarly, the anode 16d is connected to one terminal of the secondary winding 18b, and the cathode 16e is connected through the resistor 19 to the other terminal. The instantaneous relative polarities of the terminals of the secondary windings 18a and 18b are indicated in the drawing by plus and minus signs.

One secondary winding 2b of the signal voltage transformer 2 is connected in the grid cathode circuit of the left-hand conducting path of valve 16. The grid 16f is connected to the slider 20a of the adjustable resistor 20 in the cathode circuit of the right-hand conducting path. During the half-cycle in which the voltage of the anode 16a is positive, the left-hand path conducts and during the succeeding or inverse half-cycle in which the voltage of the anode 16d is positive, the right-hand path is conducting. As a result, a periodically varying voltage appears across the resistor 19. The relative magnitudes of the positive and negative half-cycles of this voltage depend upon the relative amounts of current conducted by the right- and left-hand paths of the valve 16. For example, when the current conducted by the left-hand path is the greater, the positive half-cycle of the voltage across resistor 19 will be greater than the negative half-cycle and the voltage thus contains an alternating component and a positive, direct component. Similarly, when the current conducted by the right-hand path is the greater, the negative half-cycle of the voltage across the resistor 19 will be the larger and the voltage contains an alternating component and negative, direct component. If both paths of the valve conduct equal currents, the positive and negative half-cycles of the voltage across the resistor 19 are equal and this voltage contains no direct component.

For the purpose of filtering out the alternating components from the periodically varying voltage across the resistor 19, a twin T-bridge network 21 is provided. This bridge is provided with input terminals 21a and 21b and with output terminals 21c and 21d. The input terminal 21b and output terminal 21d are connected together by a conductor 21e. One arm of the bridge comprises the two capacitors 22 and 23 connected in series between the input and output terminals 21a and 21c shunted by two resistors 24 and 25 of substantially equal resistance connected in series. The other arm comprises a capacitor 26 having one terminal connected to the common point of the two resistors and a resistor 27 having one terminal connected to the common point of the two capacitors. The opposite terminals of the capacitor 26 and the resistor 27 are connected together to the conductor 21e. A characteristic of this bridge is that a single frequency for which the bridge is balanced is canceled out. The frequency at which the bridge is balanced depends upon the electrical constants of the elements of the bridge. The bridge 21 is balanced to eliminate the frequency of the voltage across the resistor 19 which is the same as the frequency of the source 5. Thus only the direct component of this voltage appears across the output terminals 21c and 21d. The magnitude and polarity of this direct signal voltage depends upon the magnitude of the alternating signal voltage which is induced in the secondary winding and is applied between the grid 16c and the cathode 16b of the phase discriminator valve 16.

Similarly, both conducting paths of the valve 17 are supplied with an alternating voltage from two secondary windings 28a and 28b of which the primary winding (not shown) is connected to the source 15. The secondary winding 2c of the signal voltage transformer is connected in the grid-cathode circuit of the left-hand conducting path of valve 17. The instantaneous relative polarities of the voltages of the terminals of the secondary windings 2b, 2c, 18a, 18b, 28a, and 28b are indicated in the drawing by plus and minus signs. Thus when the voltages applied to the grid 16c and anode 16a are in phase and the left-hand path of the valve 16 is conducting, the voltages applied to the grid 17c and anode 17a are out of phase and the left-hand path of valve 17 is not conducting, or is conducting at a very low value. However, if the phase of the signal voltage is reversed, the left-hand path of valve 16 is rendered nonconducting or conducting at a very low value, and the left-hand path of valve 17 is rendered conducting. As a result, a direct signal voltage appears across the output terminals 29a and 29b of the T-bridge 29 which is identical with the bridge 21. The magnitude and polarity of this direct signal voltage depends upon the magnitude of the alternating signal voltage supplied to the input circuit of the phase discriminator valve 17.

From the foregoing it is seen that when a signal voltage is applied to the primary winding 2a of the signal voltage transformer, direct signal voltages appear across the output terminals 21c and 21d of bridge 21 and the output terminals 29a and 29b of bridge 29 of which the magnitude and polarity depend upon the magnitude and phase of the signal voltage. When the voltage of the output terminal 29a is positive, the voltage of output terminal 21c is negative, and when the voltage of output terminal 29a is negative, the voltage of output terminal 21c is positive.

For the purpose of short-circuiting transient voltages appearing on the grids of the Thyratrons, capacitors 30 and 31 are provided connected across the grids and cathodes of Thyratrons 12 and 13, respectively.

In order to effect operation of the motor at a speed corresponding to the magnitude of the signal voltage, the conductivity of the active Thyratron is varied by varying the firing point; i. e., the instant in the positive half-cycle of anode voltage at which conduction is initiated. This is accomplished by applying across the grid and cathode a voltage which is the sum of a fixed alternating bias voltage and a variable direct voltage. The alternating bias voltage is supplied to the grid of Thyratron 12 through the smoothing capacitor 30 by means of an RC circuit which is connected in circuit with the smoothing capacitor 30 across the grid and cathode. This RC circuit comprises a variable resistor 32 connected in series with a capacitor 33 across the secondary winding 34a of a transformer 34 of which the primary winding is supplied from the source 7, 8. As a result of the separate phase shifts produced by the capacitors 30 and 33, the alternating bias voltage which is applied between the cathode and grid of the Thyratron 12 is made approximately 90 degrees lagging with respect to the anode voltage. The combination of this alternating bias voltage with the direct signal voltage which appears across the terminals 21c and 21d results in firing the Thyratron 12 at a point in the positive half-cycle of its anode voltage which depends upon the magnitude and polarity of the direct signal voltage. When the direct signal voltage has a maximum positive value, the Thyratron is fired at or near the beginning of the positive half-cycle, and a maximum voltage is applied to the armature of the motor. Similarly, when the direct signal voltage has a maximum negative value, the Thyratron is fired near the end of the positive half-cycle, and a minimum or zero voltage is applied to the armature. For intermediate values of the direct signal voltage, the Thyratron is fired at corresponding intermediate points in the positive half-cycle, and the voltage supplied to the armature has corresponding intermediate values.

By means of a similar network comprising a transformer secondary winding 34b, a resistor 36, and a capacitor 37, an alternating bias voltage is derived which is approximately 90 degrees lagging with respect to the anode voltage of the Thyratron 13. The combination of this voltage with the direct signal voltage across the output terminals fires the Thyratron 13 at a point in the positive half-cycle of its anode voltage which is dependent on the magnitude and polarity of the direct signal voltage.

For the purpose of stabilizing the apparatus, i. e., for preventing hunting, means are provided for feeding back to the grids of the Thyratrons a direct voltage which is proportional to the rate of change of speed of the motor. The feedback voltage for the Thyratron 12 is derived from the countervoltage of the motor by means of a low-pass filter 38 and an RC circuit comprising a capacitor 39 and a resistor 40. The input terminals 38a and 38b of the filter are connected across the armature terminals 1c and 1d, and the capacitor 39 and resistor 40 are connected in series across the output terminals 38c and 38d of the filter. One terminal of the resistor 40 is connected to the cathode of the Thyratron 12 and the other terminal is connected to the output terminal 21d of the T-bridge. Thus, the resistor 40 is connected in the grid-cathode circuit of Thyratron 12. A voltage which is proportional to the rate of change of countervoltage of the motor and therefore proportional to the rate of change of speed of the motor is produced across the resistor 40, and this voltage is added to the direct signal voltage across the output terminals of the bridge.

Similarly, the feedback voltage for the Thyratron 13 is derived from the countervoltage by means of a low-pass filter 41 having input terminals 41a and 41b and output terminals 41c and 41d, and a capacitor 42, and a resistor 43 which are connected in series across the output terminals. One terminal of the resistor 43 is connected to the cathode 13b of the Thyratron and the other terminal is connected to the output terminal 29b of the bridge.

One terminal of the resistor 43 and the input and output terminals 41b and 41d are connected to the cathode 13b and since the voltage across the supply conductors 9 and 10 is connected between the cathode 13b and the armature 1, the sum of the voltage of the source and the countervoltage of the motor is supplied to the input of the filter 41. In order that the voltage supplied to the input terminals of the filter shall be equal to the countervoltage, a voltage which is equal to the magnitude of the voltage of the source but of reverse phase is supplied to the input circuit of the filter. This is accomplished by means of a transformer 44 of which the primary winding 44a is supplied from the source and the secondary winding 44b is connected between the armature terminal 1c and the filter input terminal 41a, so that the polarity of the secondary voltage opposes or is opposite to that of the voltage of the source.

An important advantage of this apparatus is that it is possible to derive the voltage of the Selsyns and the alternating bias voltage for the valves 16 and 17 from a 110-volt source and to derive the power supply voltage for the armature from a 440-volt source. Protection for the Thyratrons from failure of either source is provided by means of a valve 45 and a relay 46 controlled thereby for providing a time delay in completing the output circuit of the Thyratrons and for opening the output circuit in the event of failure of either the 110-volt or the 440-volt supply. The valve 45 is illustrated as a twin triode valve but it is connected to operate as a diode valve. The coil 46a of the relay is connected in series with this valve and the winding 18b of the low voltage transformer, and the relay contacts 46b are connected in the output circuit of the Thyratrons. The heater filament 45a of the valve 45 is supplied through a resistor 47 from a low voltage secondary winding 34c of which the primary winding 34d is connected across the supply conductors 9, 10. Since the heater filaments of the Thyratrons are supplied from the same source with no added resistance in circuit, the reduced voltage supplied to the filament 45a results in a time delay which is sufficient to enable the Thyratron cathodes to become heated before the relay contacts 46b can be closed.

With the foregoing understanding of the elements and their organization, the operation will readily be understood from the following description.

The switch 11 is closed to complete the connections from the source to the supply conductors 9, 10, and simultaneously to energize the primary winding 34d of the filament transformer. In response to energization of the filament transformer, the filaments of the Thyratrons 12 and 13 and valves 16, 17, and 45 begin to heat. Owing to the resistance in its circuit, the filament 45a heats more slowly than the filaments of the Thyratrons. After an interval of time which is sufficient to enable the filaments 12b and 13b to become heated to operating temperature, the filament 45a becomes heated sufficiently to initiate conduction. In response to conduction, the relay 46 picks up and closes its contacts 46b to complete the connection of the Thyratrons to the source.

Initially, the sliders 20a and 47a are adjusted to produce the value of direct signal voltage across the bridge output terminals 21c, 21d and 29a, 29b which will cause the Thyratrons 12 and 13 to conduct relatively small, equal amounts when the transmitter and receiver Selsyns 3 and 4 are in correspondence and the alternating signal voltage is zero. Since the Thyratrons conduct in opposite directions, the motor is at rest with a small circulating current flowing in its armature.

Rotation of the rotor of the transmitter 3 in a counterclockwise direction causes alternating signal voltages to be induced in the secondary windings 2b and 2c which are applied to the grids 16c and 17c. The voltage applied to the grid 17c is in phase with the anode voltage, and consequently, the direct signal voltage across the output terminals 29a and 29b is made less negative or more positive by an amount which depends on the magnitude of the alternating signal voltage. This results in causing the Thyratron 13 to increase the voltage supplied to the armature a corresponding amount. The alternating voltage applied to the grid 16c is 180 degrees out of phase with the anode voltage, and consequently, the conductivity of the Thyratron 12 remains unchanged.

In response to the increased current supplied to the armature by the Thyratron 13, the motor 1 accelerates in a direction which drives its load and the rotor 4b of the receiver regulator toward a position of correspondence with the rotor of the transmitter. During this acceleration, a voltage derived from the countervoltage of motor 1 appears across the resistor 43. The magnitude of this voltage is dependent upon the rate of change of speed, i. e., the acceleration of the motor 1, and its polarity is such as to make the voltage of the grid 13c less positive. As a result, the voltage supplied to the motor is decreased and the acceleration is correspondingly decreased to a value which prevents the rotor of the receiver 4 from being driven past the position of correspondence with the rotor of the transmitter 3.

If the rotor of the transmitter 3 is rotated at constant speed, a balanced condition is reached in which the rotor 4b of the receiver lags the rotor of the transmitter by an amount just sufficient to cause the motor 1 to drive the rotor of the receiver at the same speed as that of the transmitter. During this operation of the motor at constant speed, the voltage across the resistor 43 is zero.

When the rotor of the transmitter is stopped, the rotor of the receiver begins to overtake it, thereby reducing the alternating signal voltage. This initiates a deceleration of the motor which, in turn, produces a voltage across the resistor 43 which makes the grid of the Thyratron 13 more negative, thereby further increasing the rate of deceleration. As a result, the motor is decelerated and brought to rest with the rotor of the receiver in positional correspondence with the rotor of the transmitter.

Rotation of the rotor of the transmitter 3 in the reverse direction energizes the amplifier valve 16 and the Thyratron 12 to effect rotation of the motor in the reverse direction. The operation is otherwise the same as the operation for rotation in the forward direction which was described in the foregoing.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. Apparatus for controlling the speed of an electric motor comprising a source of alternating voltage having one terminal adapted to be directly connected to a first terminal of the armature of the motor, a first electric valve having an anode connected to the other terminal of said source, a cathode adapted to be connected to a second terminal of the armature and a control grid, a second electric valve reversely connected in parallel with said first valve and provided with an anode, a cathode and a control grid, means for selectively increasing the conductivity of said valves to effect rotation of the motor in a selected direction, means responsive to the voltage between the cathode of said first valve and said first armature terminal for supplying a stabilizing voltage between the grid and cathode of said first valve, means responsive to the voltage between the cathode of said second valve and said second armature terminal for supplying a stabilizing voltage between the grid and cathode of said second valve, and means for supplying a voltage between the grid and cathode of said second valve equal in magnitude and opposite in phase to the voltage of said source.

2. Apparatus for controlling the speed of an electric motor comprising a source of alternating voltage having one terminal adapted to be directly connected to a first terminal of the armature of the motor, a first electric valve having an anode connected to the other terminal of said source, a cathode adapted to be connected to a second terminal of the armature, and a control grid, a second electric valve provided with an anode, a cathode and a control grid and reversely connected in parallel with said first valve, means for selectively energizing said valves to effect rotation of said motor in a selected direction, connections from the cathode of said first valve and from said first armature terminal for supplying a stabilizing voltage between said grid and cathode of said first valve, additional connections from the cathode of said second valve and from said second armature terminal for supplying a stabilizing voltage between the cathode and grid of said second valve and a transformer having its primary winding supplied from said source and a secondary winding included in said additional connections.

3. Apparatus for controlling the speed of an electric motor comprising a source of alternating voltage having one terminal adapted to be directly connected to a first terminal of the armature of the motor, a first electric valve having an anode connected to the other terminal of said source, a cathode adapted to be connected to a second terminal of the armature, and a control grid, a second electric valve provided with an anode, a cathode and a control grid and reversely connected in parallel with said first valve, means for selectively energizing said valves to effect rotation of said motor in a selected direction, a first resistor connected in the grid circuit of said first valve, a second resistor connected in the grid circuit of said second valve, electrical connections from the cathode of said first valve and from said first armature terminal to said first resistor for supplying a stabilizing voltage to the grid circuit of said second valve, and a transformer having its primary winding supplied from said source and its secondary winding connected in series with said second resistor for supplying to the grid circuit of said second valve a voltage of substantially the same magnitude as the voltage of said source and of opposite phase.

4. Apparatus for controlling the speed of an electric motor comprising a source of alternating voltage having one terminal adapted to be directly connected to a first terminal of the armature of the motor, a first electric valve having an anode connected to the other terminal of said source, a cathode adapted to be connected to a second terminal of the armature, and a control grid, a second electric valve provided with an anode, a cathode and a control grid and reversely connected in parallel with said first valve, means for selectively energizing said valves to effect rotation of said motor in a selected direction, a first resistor connected in the grid circuit of said first valve, a second resistor connected in the grid circuit of said second valve, a low pass filter having its input terminals connected across the cathode of said first valve and said first armature terminal, and having its output terminal connected to supply a stabilizing voltage across said first resistor, a second low pass filter having its input terminals connected across the cathode of said second valve and said second armature terminal for supplying a stabilizing voltage across said second resistor, and a transformer having its primary winding supplied from said source and its secondary winding connected in series with said second resistor for supplying to the grid circuit of said second valve a voltage of substantially the same magnitude as the voltage of said source and of opposite phase.

5. Apparatus for controlling the speed of an electric motor comprising a source of alternating voltage having one terminal adapted to be directly connected to a first terminal of the armature of the motor, a first electric valve having an anode connected to the other terminal of said source, a cathode adapted to be connected to a second terminal of the armature, and a control grid, a second electric valve provided with an anode, a cathode and a control grid and reversely connected in parallel with said first valve, means for selectively energizing said valves to effect rotation of said motor in a selected direction, a first resistor connected in the grid circuit of said first valve, a second resistor connected in the grid circuit of said second valve, a low pass filter having its input terminals connected across the cathode of said first valve and said first armature terminal, a capacitor connected in series with said first resistor across the output terminals of said filter to supply a stabilizing voltage proportional to the rate of change of speed of the motor to the grid circuit of said first valve, a second low pass filter having its input terminals connected across the cathode of said second valve and said second armature terminal, a capacitor connected in series with said second resistor across the output terminals of said second filter to supply a stabilizing voltage proportional to the rate of change of speed of the motor to the grid circuit of said second valve, and a transformer having its primary winding supplied from said source and its secondary winding connected in circuit with said second filter for supplying to the grid circuit of said second valve a voltage of substantially the same magnitude as the voltage of said source and of reverse phase.

6. Apparatus for controlling an electric motor comprising means for producing an alternating signal voltage, electric valve means responsive to said signal voltage for producing a periodically varying voltage having an alternating component and a direct component, a T bridge connected to be responsive to said periodically varying voltage and balanced at the frequency of said periodically varying voltage thereby to produce at its output terminals a direct signal voltage having a magnitude and polarity dependent upon the magnitude of said alternating signal voltage, and electric valve means controlled by said direct signal voltage for supplying a voltage to said motor to effect rotation thereof at a speed corresponding to the magnitude of said direct signal voltage.

7. Apparatus for controlling an electric motor comprising electric valve apparatus provided with an anode, a cathode and a control grid for supplying voltage to a motor, means for supplying an alternating bias voltage to said grid, means for producing an alternating signal voltage, means responsive to said alternating voltage for producing a periodically varying voltage having an alternating component and a direct component comprising an electric valve amplifier having an input circuit connected to be supplied with said signal voltage and having two parallel reversely connected conducting paths in its output circuit, means responsive to said periodically varying voltage for supplying to said grid a direct signal voltage having a magnitude and polarity dependent on the magnitude of said alternating signal voltage comprising a T bridge balanced at the frequency of said periodically varying voltage and having its input terminals connected to the output circuit of said amplifier and its output terminals connected between said grid and cathode.

8. Control apparatus for an electric motor comprising a pair of electric power valves each provided with an anode, a cathode and a control grid for controlling the supply of voltage to a motor, means for producing alternating signal voltage of reverse phase, phase discriminator means responsive to reverse phase alternating signal voltages for selectively producing periodically varying voltages having a direct component and an alternating component comprising a pair of electric valve amplifiers each having an input circuit connected to be supplied with said alternating voltage and an output circuit, means responsive to said periodically varying voltages for supplying direct signal voltages to the grid circuits of said power valves comprising a pair of T bridges, one for each of said amplifiers, and balanced at the frequency of said periodically varying voltages, each of said bridges having its input terminals connected to the output circuit of a different one of said amplifiers and having its output terminals connected to the grid circuit of a different one of said power valves.

RAYMOND W. LAVENDER.